(12) United States Patent
Kamiya et al.

(10) Patent No.: US 8,250,858 B2
(45) Date of Patent: Aug. 28, 2012

(54) EXHAUST GAS CLEANING SYSTEM FOR CONSTRUCTION MACHINE

(75) Inventors: Shohei Kamiya, Kasumigaura (JP); Kazunori Nakamura, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 285 days.

(21) Appl. No.: 12/523,810

(22) PCT Filed: Aug. 6, 2008

(86) PCT No.: PCT/JP2008/064159
§ 371 (c)(1),
(2), (4) Date: Jul. 20, 2009

(87) PCT Pub. No.: WO2009/041164
PCT Pub. Date: Apr. 2, 2009

(65) Prior Publication Data
US 2010/0089035 A1    Apr. 15, 2010

(30) Foreign Application Priority Data
Sep. 25, 2007  (JP) ................................. 2007-247946

(51) Int. Cl.
*F01N 3/18* (2006.01)

(52) U.S. Cl. ................ 60/295; 60/276; 60/286; 60/297; 60/303; 60/311

(58) Field of Classification Search .............. 60/276, 60/286, 295, 297, 303, 311
See application file for complete search history.

(56) References Cited

U.S. PATENT DOCUMENTS

| | | | | |
|---|---|---|---|---|
| 5,397,550 A | * | 3/1995 | Marino, Jr. | 422/178 |
| 5,716,586 A | * | 2/1998 | Taniguchi | 422/173 |
| 6,352,133 B1 | * | 3/2002 | Ojima | 180/326 |
| 6,422,001 B1 | * | 7/2002 | Sherman et al. | 60/274 |
| 2004/0226287 A1 | * | 11/2004 | Edgar et al. | 60/295 |
| 2006/0232116 A1 | * | 10/2006 | Jang et al. | 297/354.1 |
| 2008/0307773 A1 | * | 12/2008 | Kogo | 60/286 |

FOREIGN PATENT DOCUMENTS

| | | |
|---|---|---|
| JP | 6-280289 A | 10/1994 |
| JP | 11-314882 A | 11/1999 |
| JP | 2001-280118 A | 10/2001 |
| JP | 2003-184537 A | 7/2003 |
| JP | 2005-163603 A | 6/2005 |
| JP | 2005-282545 A | 10/2005 |
| JP | 2005-299436 A | 10/2005 |

(Continued)

*Primary Examiner* — Kenneth Bomberg
*Assistant Examiner* — Jorge Leon, Jr.
(74) *Attorney, Agent, or Firm* — Mattingly & Malur, PC

(57) ABSTRACT

Before a large amount of PM is deposited in a filter 32, an exhaust gas cleaning system for a construction machine regenerates the filter to avoid a decrease in output due to the exhaust gas pressure rise occurring immediately before the filter is regenerated, and to reduce the likelihood of unusual increases in the internal temperature of the filter due to the combustion of the PM, associated with the execution of the regeneration, and consequential thermal damage to the filter. If a value of a differential pressure across the filter 32 is greater than a predetermined pressure, a controller 4 conducts engine speed control to a predetermined rotating speed Na suitable for the regeneration, then enters forced regeneration automatically, and burns off the PM. When the sensed differential pressure decreases below a predetermined pressure, the regeneration is terminated automatically and the engine 1 is stopped.

7 Claims, 5 Drawing Sheets

FOREIGN PATENT DOCUMENTS

| | | |
|---|---|---|
| JP | 2006-83828 A | 3/2006 |
| JP | 2007-170382 A | 7/2007 |
| JP | 2007-187006 A | 7/2007 |
| JP | 2007-205240 A | 8/2007 |
| JP | 2007-239624 A | 9/2007 |

* cited by examiner

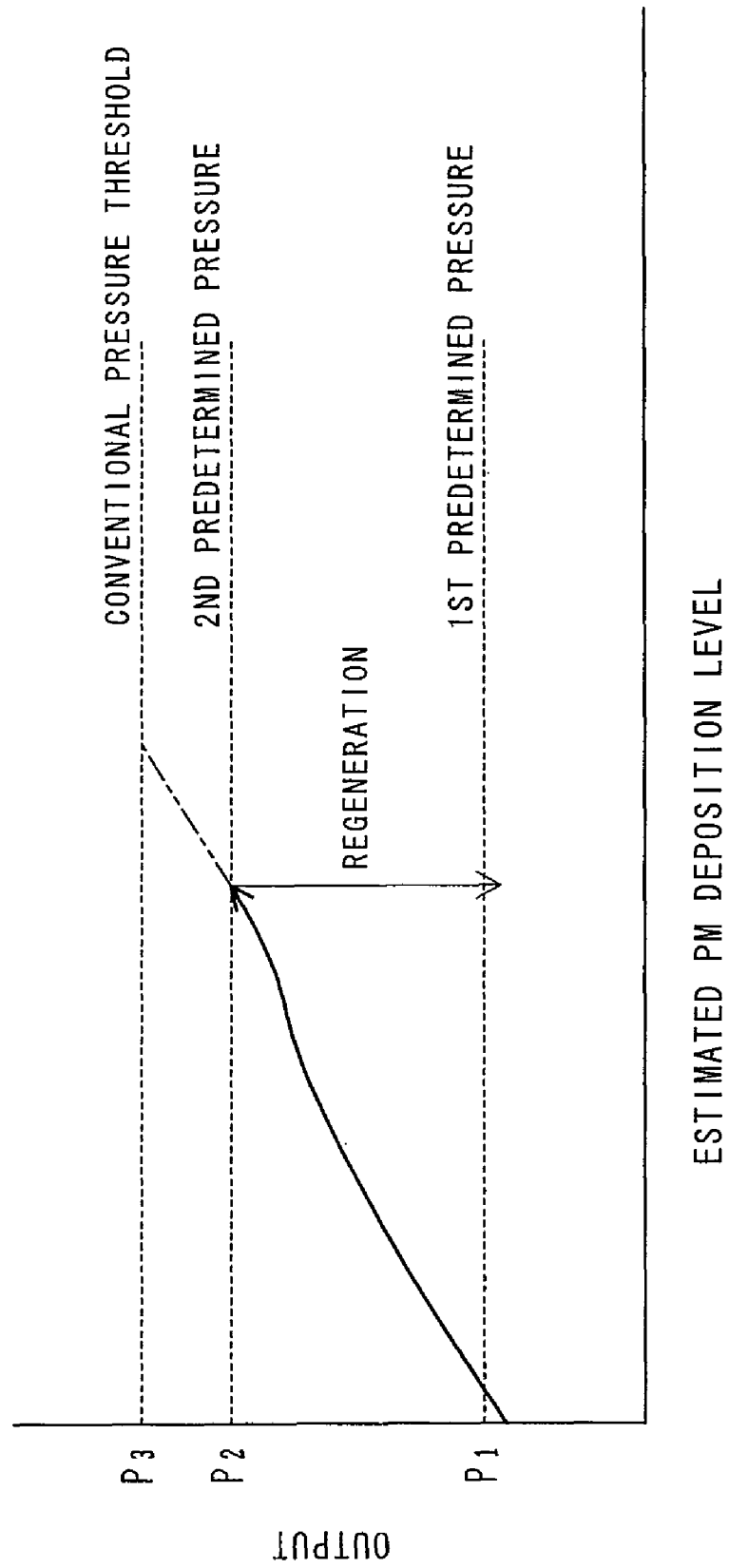

EXHAUST GAS CLEANING SYSTEM FOR CONSTRUCTION MACHINE

TECHNICAL FIELD

The present invention relates generally to exhaust gas cleaning systems for construction machines. More particularly, the invention concerns an exhaust gas cleaning system for a construction machine, the system being intended to clean exhaust gases by filter-trapping any particulate matter included in the exhaust gases, and to regenerate the filter by burning off the filter-trapped particulate matter as appropriate.

BACKGROUND ART

Hydraulic excavators and other construction machines have a diesel engine as a driving source for the machine. Regulations on the amount of particulate matter (PM) emitted from the diesel engine are being strengthened each year along with those of NOx, CO, HC, and the like. Exhaust gas cleaning systems for trapping PM with a filter called the diesel particulate filter (DPF), and reducing the amount of PM emitted to the outside, are known to be effective under the increasingly stringent regulation situation (refer to Patent Documents 1 to 3). In these exhaust gas cleaning systems, since increases in the amount of filter-trapped PM clog the filter, thus increase the engine exhaust gas pressure, and result in undesirable events such as decreases in fuel efficiency, the filter-trapped PM is burned in appropriate timing to remove the PM clogging the filter, and hence to regenerate the filter.

The filter is usually regenerated using an oxidizing catalyst. The oxidizing catalyst may be disposed at the upstream side of the filter or supported by the filter directly or provided in both forms. In all of the three cases, to activate the oxidizing catalyst, it is necessary that the engine exhaust gas temperature be higher than the activation temperature of the oxidizing catalyst. Therefore, the technology called "forced regeneration" that forcibly increases the exhaust gas temperature above the activation temperature of the oxidizing catalyst is applied. Forced regeneration uses, for example, one of two methods: increasing the exhaust gas temperature by, as disclosed in Patent Document 1 or 2, conducting subsidiary injection (post-injection) to inject the fuel during the expansion stroke of the engine after in-cylinder main injection, or as disclosed in Patent Document 3, increasing the exhaust gas temperature by injecting the fuel into the exhaust gases flowing through a regenerating fuel injector provided in the exhaust pipe.

Also, forced regeneration of the filter has two forms: manual regeneration, which is started upon operator input of an operating instruction; and automatic regeneration, which is started automatically. Traditionally, as described in Patent Documents 1 and 2, regeneration in these forced regeneration forms is started in the timing that the estimated amount of PM deposition in the filter (i.e., the estimated accumulation level) reaches the previously set maximum permissible accumulation level of PM. In this case, as in the technique of Patent Document 1, the amount of PM deposition computed is generally based upon the sensed value of a differential pressure existing across the filter. Another computing method is by, as in the technique of Patent Document 2, reading in the output values of a speed sensor, a load sensor, and a temperature sensor, then after calculating the amount of PM emission, We, and the amount of PM combustion, Wc, deriving the amount of PM deposition, Wa, from Wa=We−Wc, and adding Wa1, the previous value of Wa, to newly obtain an integrated deposition level Wa1.

Patent Document 1: JP-A-2005-282545
Patent Document 2: JP-A-2001-280118
Patent Document 3: JP-A-2007-170382

DISCLOSURE OF THE INVENTION

Problems to be Solved by the Invention

As described above, in the conventional exhaust gas cleaning systems, the amount of PM deposited in the filter is estimated and forced regeneration is started upon the arrival of this estimated PM deposition level at a predetermined value. However, the regeneration occurs after a large amount of PM has been trapped by the filter, so this is likely to cause decreases in output due to exhaust gas pressure rises existing immediately before the regeneration is started. In addition, in the method of computing the PM deposition level by sensing the differential pressure across the filter, the relationship between the differential pressure across the filter and the PM deposition level is not linear, and the PM deposition level is difficult to derive accurately by computing. The same problem also occurs in the method of deriving the PM deposition level by calculating the PM emission level We and the PM combustion level Wc, since the relationship between the sensor data, the PM emission level We, and the PM combustion level Wc, is disturbed by various factors. Unusual increases in the internal temperature of the filter due to the combustion of the large amount of trapped PM, thermal damage to the filter that may originate from the unusual temperature rises, and other problems are liable to result if the PM deposition level cannot be derived accurately by computing.

An object of the present invention is to provide an exhaust gas cleaning system for a construction machine, constructed so that before a large amount of PM becomes deposited in a filter, the system regenerates the filter to avoid a decrease in output due to an exhaust gas pressure rise existing immediately before the regeneration is started, and to reduce the likelihood of an unusual increase in an internal temperature of the filter due to combustion of the PM, associated with execution of the regeneration, and consequential thermal damage to the filter.

Means for Solving the Problems (1) In order to achieve the above object, an aspect of the present invention is an exhaust gas cleaning system for a construction machine equipped with a diesel engine, a starting/stopping command device (engine key switch) that issues commands to start and stop the engine, a plurality of driven bodies, each actuated by motive power of the engine, operating means for issuing an operating command to each of the driven bodies, and an operational limiter (gate lock lever) adapted to be selectively actuated to either a first position to enable operation of the operating means, or a second position to disenable the operation of the operating means, the system comprising: a filter disposed in an exhaust system of the engine in order to trap any particulate matter included in exhaust gases; a regenerating device that regenerates the filter by burning off the particulate matter deposited therein; and a regeneration control device that activates the regenerating device when the starting/stopping command device (engine key switch) issues the engine-stopping command with the operational limiter (gate lock lever) in the second position.

As described above, since the system includes the regenerating device and the regeneration control device and is constructed to activate the regenerating device upon the issuance of the engine-stopping command from the starting/stopping command device with the operational limiter in the second position, when an operator actuates the operational limiter to the second position and uses the starting/stopping command device to assign the engine-stopping command in order to end a job that uses the construction machine, the regenerating device automatically operates and the system enters a forced regeneration mode and burn off the PM deposited in the filter. In this case, for full-day operation of the construction machine, termination of work with the construction machine by the operator is repeated four times, namely, when the operator takes a midmorning tea break, when he or she takes a lunch break, when he or she takes a midafternoon tea break, and when he/she ends working in the afternoon to end the work for the day. This frequency is greater than a rate at which the start of forced regeneration is repeated each time the PM deposition level in the filter exceeds a deposition level existing immediately before the regeneration is started. That is to say, forced regeneration, when started upon the issuance of the engine-stopping command from the starting/stopping command device with the operational limiter in the second position, can be repeated more often than in the case that the start of forced regeneration is repeated each time the PM deposition level in the filter exceeds the deposition level existing before the regeneration is started.

This allows the filter to be regenerated before a large amount of PM becomes deposited therein. Thus, a decrease in output due to the exhaust gas pressure rise existing immediately before the regeneration is started can be avoided and the likelihood of an unusual increase in an internal temperature of the filter due to the combustion of the PM, associated with execution of the regeneration, and consequential thermal damage to the filter can be reduced.

(2) In above item (1), preferably the system further includes a pressure sensor that senses a loss of pressure in the filter, wherein the regeneration control device deactivates the regenerating device immediately after the pressure loss sensed by the pressure sensor has decreased below a first predetermined pressure level.

Thus, when a differential pressure across the filter is reduced below the first predetermined pressure, the regeneration terminates automatically and the engine stops, so convenience improves in that the operator, without needing to wait for the regeneration to end, can leave the construction machine immediately after the work. A decrease in filter life due to overburning can also be prevented.

(3) In above item (1), preferably the system further includes a regeneration canceling instruction device that issues a command for canceling the operation of the regenerating device, wherein the regeneration control device deactivates the regenerating device after the command for canceling the operation of the regenerating device has been issued from the regeneration canceling instruction device.

This starts forced regeneration, and when a need arises for the operator to start the work before forced regeneration ends, he or she can terminate forced regeneration just by operating the regeneration canceling instruction device, and thus stop the engine. Thus, the work can be restarted immediately.

(4) In above item (1), preferably the system further includes a pressure sensor that senses a loss of pressure in the filter, wherein the regeneration control device activates the regenerating device after the command for stopping the engine has been issued from the starting/stopping command device (engine key switch) with the operational limiter (gate lock lever) in the second position and the pressure loss sensed by the pressure sensor has exceeded a second predetermined pressure level.

Thus, even when the operational limiter is actuated to the second position and the stop of the engine is commanded from the starting/stopping command device, unless the differential pressure across the filter is higher than the second predetermined pressure, the engine is immediately stopped without the system entering the forced regeneration mode. As a result, unnecessary regeneration can be avoided and a decrease in filter life due to overburning can also be prevented.

(5) In above item (1), preferably the regeneration control device also activates the regenerating device when the command for stopping the engine is issued from the starting/stopping command device (engine key switch) with the operational limiter (gate lock lever) in the second position. Additionally, the regeneration control device controls a rotating speed of the engine to a predetermined level.

Thus, when the operational limiter is actuated to the second position and the system enters the forced regeneration mode following completion of the engine-stopping command issuance from the starting/stopping command device, since the engine speed is controlled to a predetermined level fit for the regeneration, the exhaust gases can be raised rapidly to a temperature fit for the regeneration of the filter (i.e., the burning-off of the deposited PM). Optimal regeneration is thus enabled. In addition, when the engine speed existing before the system enters the forced regeneration mode is higher than a predetermined speed for the regeneration, the engine speed is lowered to the predetermined level immediately before the system enters the forced regeneration mode, so unnecessary fuel consumption can be suppressed to save fuel consumption.

(6) In above item (1), preferably the system further includes a regeneration starting instruction device that issues a command for operating the regenerating device, wherein, only when the regeneration starting instruction device is operated to command the activation of the regenerating device, does the regeneration control device activate the regenerating device upon the issuance of the engine-stopping command from the starting/stopping command device (engine key switch) with the operational limiter (gate lock lever) in the second position.

Accordingly, when the operator desires not to make the system enter the forced regeneration mode automatically upon the issuance of the engine-stopping command from the starting/stopping command device, provided that the regeneration starting instruction device is operated not to command the activation of the regenerating device, the issuance of the engine-stopping command from the starting/stopping command device immediately stops the engine, thus allowing preselection of appropriate automatic regeneration according to a particular working situation or taste of the operator, and hence, improvement of convenience.

(7) In above item (1), preferably the regenerating device further includes an oxidizing catalyst disposed at an upstream side of the filter, and fuel supply means for supplying a fuel to the oxidizing catalyst, wherein, after activating the oxidizing catalyst by forcibly raising a temperature of the engine exhaust gases to a level higher than the activation temperature of the oxidizing catalyst, the regenerating device supplies the fuel from the fuel supply means to the oxidizing catalyst and raises the exhaust gas temperature by means of the heat generated by a reaction between the fuel and the catalyst. The particulate matter deposited in the filter is thus burnt off.

This allows reliable forced regeneration of the filter.

Effects of the Invention

According to the present invention, since forced regeneration can be repeated more often than in the case that the start of forced regeneration is repeated each time the PM deposition level in the filter exceeds the deposition level existing before the regeneration is started, the filter can be regenerated before a large amount of PM becomes deposited, and thus a decrease in output due to the exhaust gas pressure rise existing immediately before the regeneration is started can be avoided. In addition, the likelihood of an unusual increase in the internal temperature of the filter due to the combustion of the PM, associated with execution of the regeneration, and consequential thermal damage to the filter can be reduced.

BRIEF DESCRIPTION OF THE DRAWINGS

FIG. 5 is a diagram showing a relationship between an estimated PM deposition level in the filter and a differential pressure existing across the filter.

Figure 1:
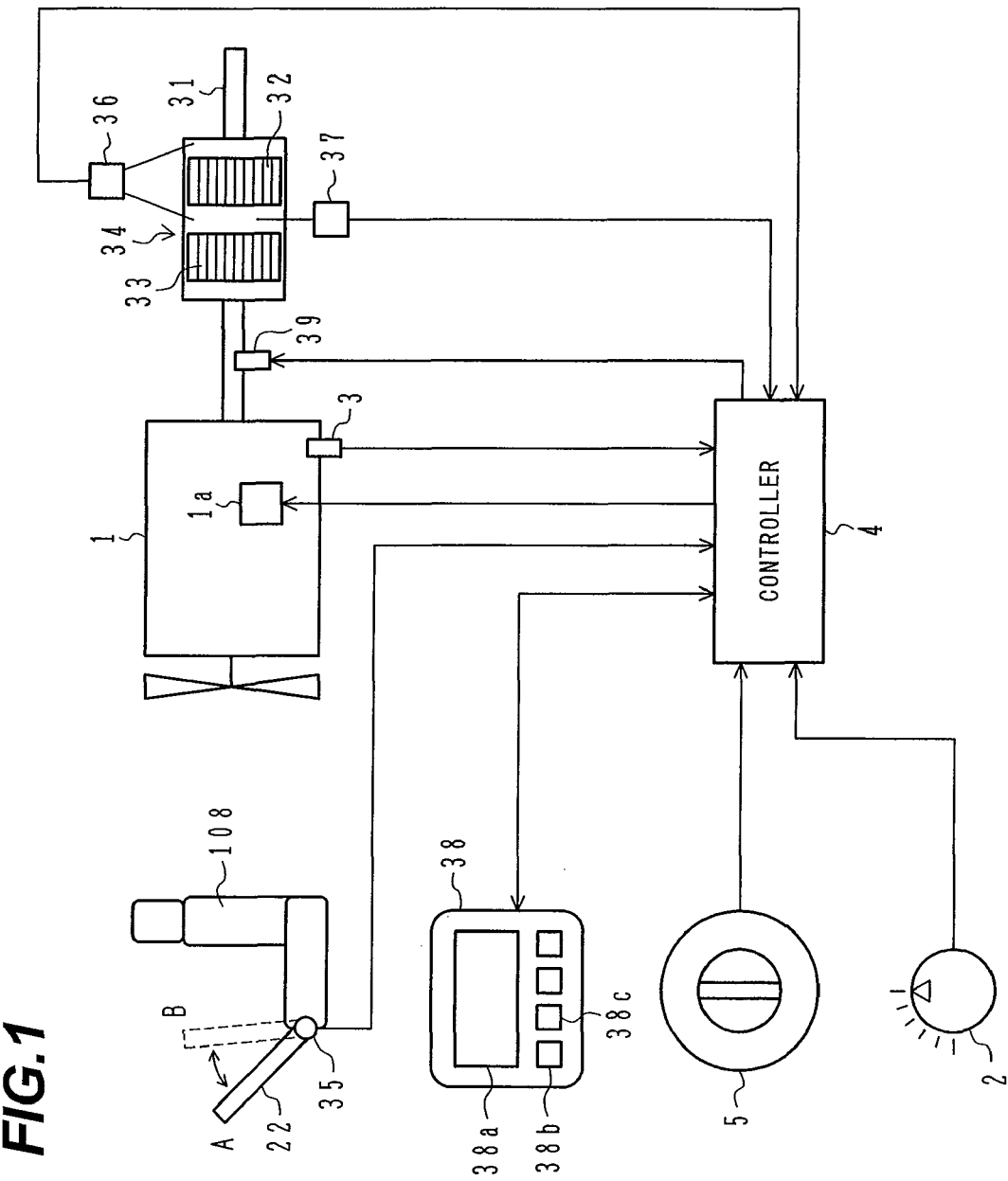
FIG. 1 is a total system block diagram showing an exhaust gas cleaning system for a construction machine according to an embodiment of the present invention.

1 Diesel engine
1a Electronic governor
2 Engine control dial
3 Speed sensor
4 Controller
5 Key switch
11 Hydraulic pump
12 Pilot pump
13 Hydraulic motor
14, 15 Hydraulic cylinders
17 to 19, Flow control valves
20 Pilot hydraulic source
21 Pilot relief valve
22 Gate lock lever
23 Solenoid control valve
24 Pilot hydraulic line
25, 26, 27 Remotely controlled valves
31 Exhaust pipe
32 Filter
33 Oxidizing catalyst
34 DPF unit
35 Position sensor
36 Differential pressure sensor
37 Exhaust gas temperature sensor
38 Display unit (Monitor)
38a Display screen
38b Automatic regeneration selecting switch
38c Regeneration canceling switch
39 Regenerating fuel injector
100 Lower structure (For traveling)
101 Upper structure (For swinging)
102 Front operating device
104a, 104b Traveling motors
105 Swinging motor
106 Engine room
107 Cabin
108 Operator's seat
111 Boom
112 Arm
113 Bucket
114 Boom cylinder
115 Arm cylinder
116 Bucket cylinder

BEST MODE FOR CARRYING OUT THE INVENTION

Hereunder, an embodiment of the present invention will be described with reference to the accompanying drawings.

FIG. 1 is a total system block diagram showing an exhaust gas cleaning system for a construction machine according to an embodiment of the present invention.

Referring to FIG. 1, reference number 1 denotes a diesel engine mounted in the construction machine (e.g., a hydraulic excavator) that has the exhaust gas cleaning system of the present embodiment. The engine 1 includes an electronic governor 1a that is an electronic type of fuel injection control unit. A command specifying a desired rotating speed of the engine 1 is issued from an engine control dial 2, and an actual operating speed of the engine 1 is sensed by a speed sensor 3. The command signal from the engine control dial 2 and a sensor signal from the speed sensor 3 are input to a controller 4, which uses the command signal (target speed) and the sensor signal (actual speed) appropriately to control the electronic governor 1a and thus control the speed of the engine 1 and a torque thereof. Additionally, the exhaust gas cleaning system has a key switch 5 that operates as a starting/stopping command device for the engine 1. Command signals from the key switch 5 are also input to the controller 4, which controls start and stop of the engine 1 on the basis of the command signals. That is to say, when the key switch 5 is actuated to an ON position that specifies the start of the engine, and the command signal from the key switch 5 specifies the engine start, the controller 4 drives a starting motor (not shown) and the electronic governor 1a, thus starting the engine 1. When the key switch 5 is actuated to an OFF position that specifies the stop of the engine, and the command signal from the key switch 5 specifies the engine stop, the controller 4 deactivates the electronic governor 1a, thus stopping the engine 1.

Figure 2:
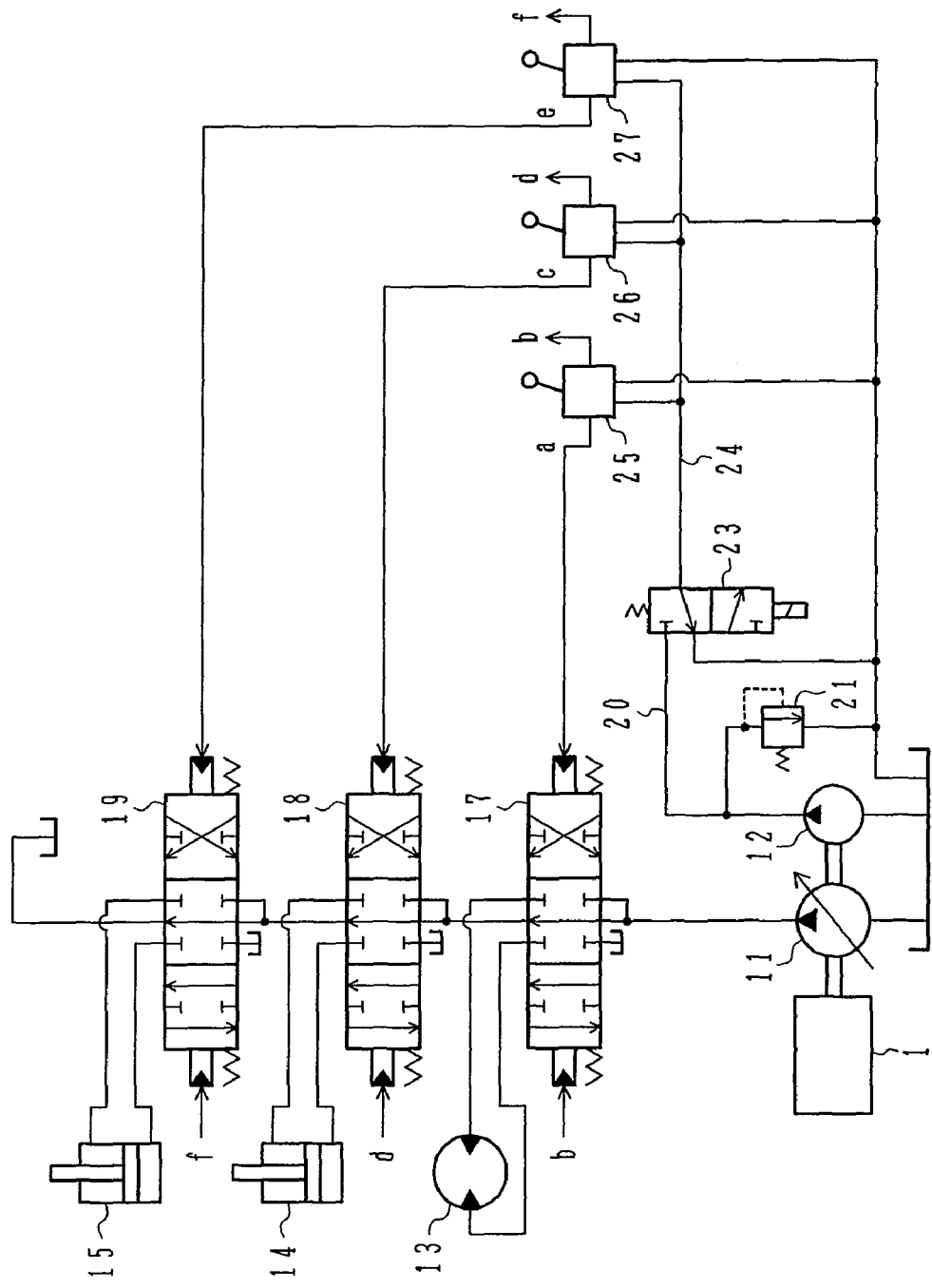
FIG. 2 is a diagram showing a hydraulic driving unit mounted in the construction machine (e.g., a hydraulic excavator)

FIG. 2 is a diagram showing a hydraulic driving unit mounted in the construction machine (e.g., a hydraulic excavator). The hydraulic driving unit has: a variable-capacity type of main hydraulic pump 11 and a fixed-capacity type of pilot pump 12, both types of pumps being driven by the engine 1; a plurality of actuators including a hydraulic motor 13 and hydraulic cylinders 14, 15, each of the motor and the cylinders being driven by a hydraulic operating fluid delivered from the hydraulic pump 11; a plurality of flow control valves inclusive of pilot-actuated flow control valves 17 to 19 to control a flow (flow rate and direction) of the hydraulic operating fluid supplied from the hydraulic pump 11 to the hydraulic motor 13 and each hydraulic cylinder 14, 15; a pilot relief valve 21 for maintaining a constant pressure of the hydraulic operating fluid delivered from the pilot pump 12, and forming a pilot hydraulic source 20; a solenoid control valve 23 connected to a downstream side of the pilot hydraulic source 20 and controlled to an ON or OFF position, depending upon an open or closed condition of a gate lock lever 22 (see FIG. 1) that is provided at an accessway to an operator's seat of the hydraulic excavator; and remotely controlled valves 25, 26, 27 connected to a pilot hydraulic line 24 at the downstream side of the solenoid control valve 23 in order to generate control pilot pressures "a" to "f" that use the oil pressure of the pilot hydraulic source 20 as a main pressure to operate the flow control valves 17 to 19, the remotely controlled valves 25, 26, 27 being built into left and right control lever units (not shown) that are provided at left and right sides of the operator's seat.

Figure 3:
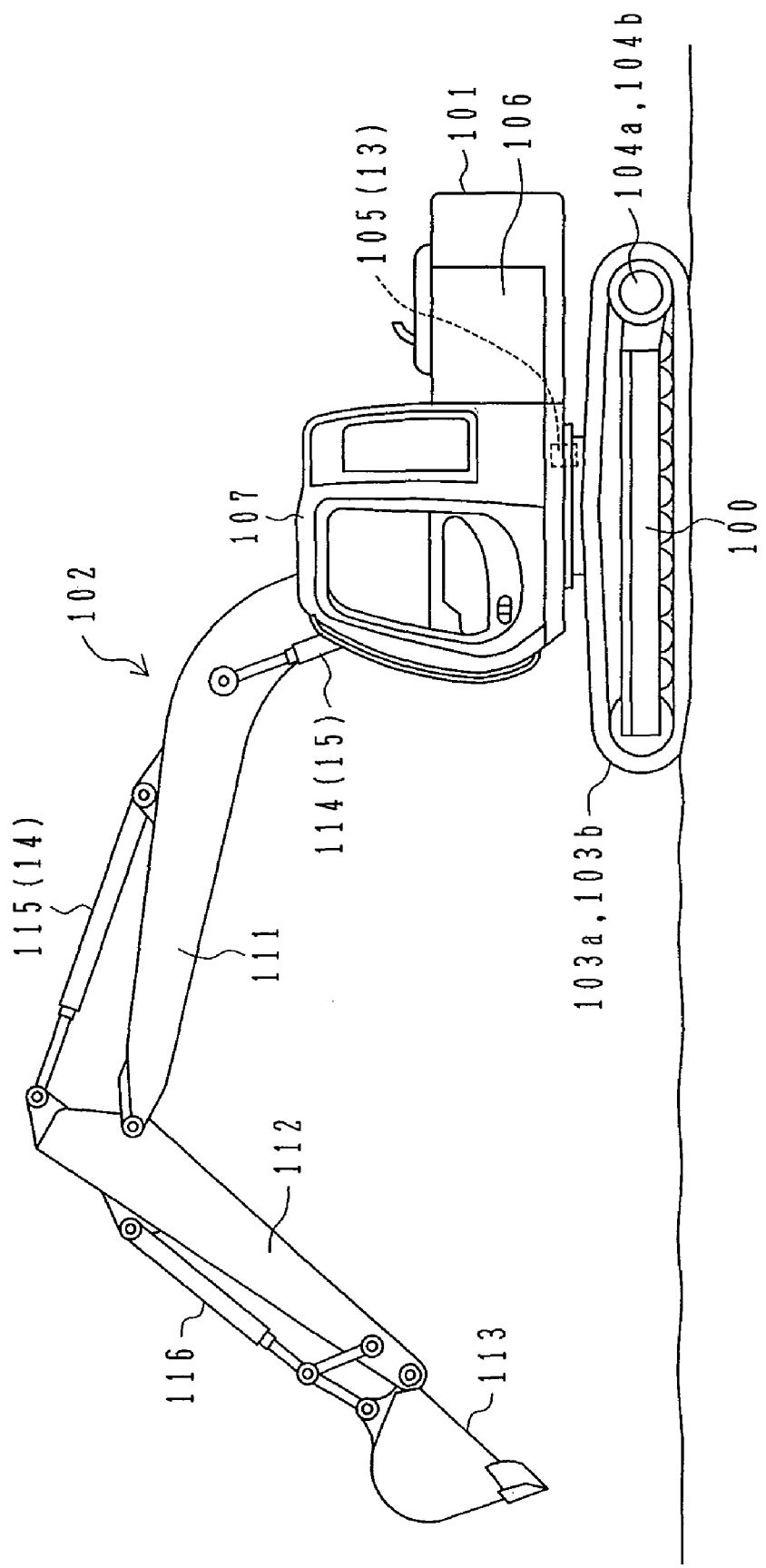
FIG. 3 is an external view of a hydraulic excavator, an example of a construction machine including the hydraulic driving unit shown in FIG. 2.

FIG. 3 is an external view of the hydraulic excavator, an example of a construction machine including the hydraulic driving unit shown in FIG. 2. The hydraulic excavator includes a lower structure 100 (for traveling use), an upper structure 101 (for swinging use), and a front operating device 102. The lower structure 100 has left and right crawler-mounted traveling devices 103a and 103b, and is driven by left and right traveling motors 104a and 104b. The upper structure 101 is mounted on the lower structure 100 so as to be swingable by a swinging motor 105, and the front operating device 102 is installed at an anterior section of the upper structure 101 so as to be vertically inclinable. The upper structure 101 includes an engine room 106 and a cabin 107. The engine 1 is disposed in the engine room 106, the gate lock lever 22 (see FIG. 1) is provided at the accessway to the internal operator's seat 108 (also, see FIG. 1) in the cabin 107, and the control lever units (not shown) that contain the remotely controlled valves 25, 26, 27 are arranged at the left and right sides of the operator's seat 108.

The front operating device 102 is a multi-articulated structure having a boom 111, an arm 112, and a bucket 113, the boom 111 being pivoted vertically by expanding/contracting actions of a boom cylinder 114, the arm 112 being pivoted vertically and longitudinally by expanding/contracting actions of an arm cylinder 115, and the bucket 113 being pivoted vertically and longitudinally by expanding/contracting actions of a bucket cylinder 116.

Referring to FIG. 2, the hydraulic motor 13 operates in association with, for example, the swinging motor 105, the hydraulic cylinder 14 operates in association with, for example, the arm cylinder 115, and the hydraulic cylinder 15 operates in association with, for example, the boom cylinder 114. The hydraulic driving unit shown in FIG. 2 includes the hydraulic actuators and control valves corresponding to the traveling motors 104a, 104b, the bucket cylinder 116, and the like, but these actuators and control valves are omitted in FIG. 2.

Referring back to FIG. 1, the gate lock lever 22 can be selectively actuated to either a first position A that is a lever-lowering position for limiting the accessway to the operator's seat 108, or a second position B that is a lever-raising position for releasing the accessway to the operator's seat 108. When the gate lock lever 22 is present at the first position A, the solenoid of the solenoid control valve 23 is energized to switch this valve from a position shown in the figure. As a result, the pressure of the pilot hydraulic source 20 is guided to the remotely controlled valves 25, 26, 27, thus enabling the operation of the flow control valves 17 to 19 by the remotely controlled valves 25, 26, 27. When the gate lock lever 22 is raised to the second position B, the solenoid of the solenoid control valve 23 is de-energized to switch this valve to another position shown in the figure. As a result, communication between the pilot hydraulic source 20 and the remotely controlled valves 25, 26, 27 is shut off to disable the operation of the flow control valves 17-19 by the remotely controlled valves 25, 26, 27. In other words, raising the gate lock lever 22 to the second position B means a lock-on state with respect to the remotely controlled valves 25, 26, 27 (control lever unit). Position switching of the solenoid control valve 23 by the gate lock lever 22 is accomplished by, for example, using a switch (not shown) that is connected between the solenoid of the solenoid control valve 23 and a power supply. When the gate lock lever 22 is present at the first position A, that switch is turned on (closed) to energize the solenoid, and when the gate lock lever 22 is raised to the second position B, the switch is turned off (opened) to de-energize the solenoid.

The exhaust gas cleaning system of the present embodiment is equipped in the above-described construction machine (hydraulic excavator). The exhaust gas cleaning system of the present embodiment includes: a filter 32 disposed in an exhaust pipe 31 that forms part of an exhaust system of the engine 1, and adapted to trap any particulate matter included in exhaust gases; a DPF unit 34 including an oxidizing catalyst 33 disposed at an upstream side of the filter 32; a position sensor 35 for sensing the operating position of the gate lock lever 22; a differential pressure sensor 36 for sensing a differential pressure existing between the upstream side of the filter 32 and a downstream side thereof (i.e., a pressure loss in the filter 32); an exhaust gas temperature sensor 37 set up at the upstream side of the filter 32 in order to sense a temperature of the exhaust gases; a display unit (monitor) 38; and a regenerating fuel injector 39 provided between the engine 1 and the DPF unit 34, near the exhaust pipe 31. The oxidizing catalyst 33 and the regenerating fuel injector 39 constitute a regenerating device that regenerates the filter 32 by burning off the particulate matter (PM) deposited therein.

The display unit 38 has a display screen 38a, an automatic regeneration selecting switch 38b that operates as a regeneration-starting instruction device, and a regeneration canceling switch 38c that operates as a regeneration-canceling instruction device. The automatic regeneration selecting switch 38b is used for conducting a control of specifying whether forced regeneration of the filter 32 is to be conducted automatically (i.e., whether an automatic regeneration mode is to be selected). Switching the automatic regeneration selecting switch 38b from an OFF position (automatic regeneration mode non-selecting position) to an ON position (automatic regeneration mode selecting position) generates an output of a command signal to specify the automatic regeneration mode. The regeneration canceling switch 38c is used for conducting a control of specifying whether ongoing forced regeneration of the filter 32 is to be canceled. Switching the regeneration canceling switch 38c from an OFF position (regeneration non-canceling position) to an ON position (regeneration canceling position) generates an output of a command signal to specify the cancellation of regeneration.

Sensor signals from the position sensor 35, differential pressure sensor 36, and exhaust gas temperature sensor 37, and the command signals from the automatic regeneration selecting switch 38b and regeneration canceling switch 38c are input to the controller 4, which then conducts a filter-regenerating arithmetic process based upon those input signals and input signals received from the foregoing speed sensor 3 and key switch 5, and controls the electronic governor 1a and the regenerating fuel injector 39 according to particular arithmetic results. The controller 4 transmits the information indicated by the various signals of the speed sensor 3, key switch 5, position sensor 35, differential pressure sensor 36, exhaust gas temperature sensor 37, automatic regeneration selecting switch 38b, and regeneration canceling switch 38c, as display signals, to the display unit 38. The controller 4 also transmits filter-regenerating arithmetic process result information as a further display signal to the display unit 38. Upon receiving these kinds of information, the display unit 38 displays the information on the display screen 38a.

Figure 4:
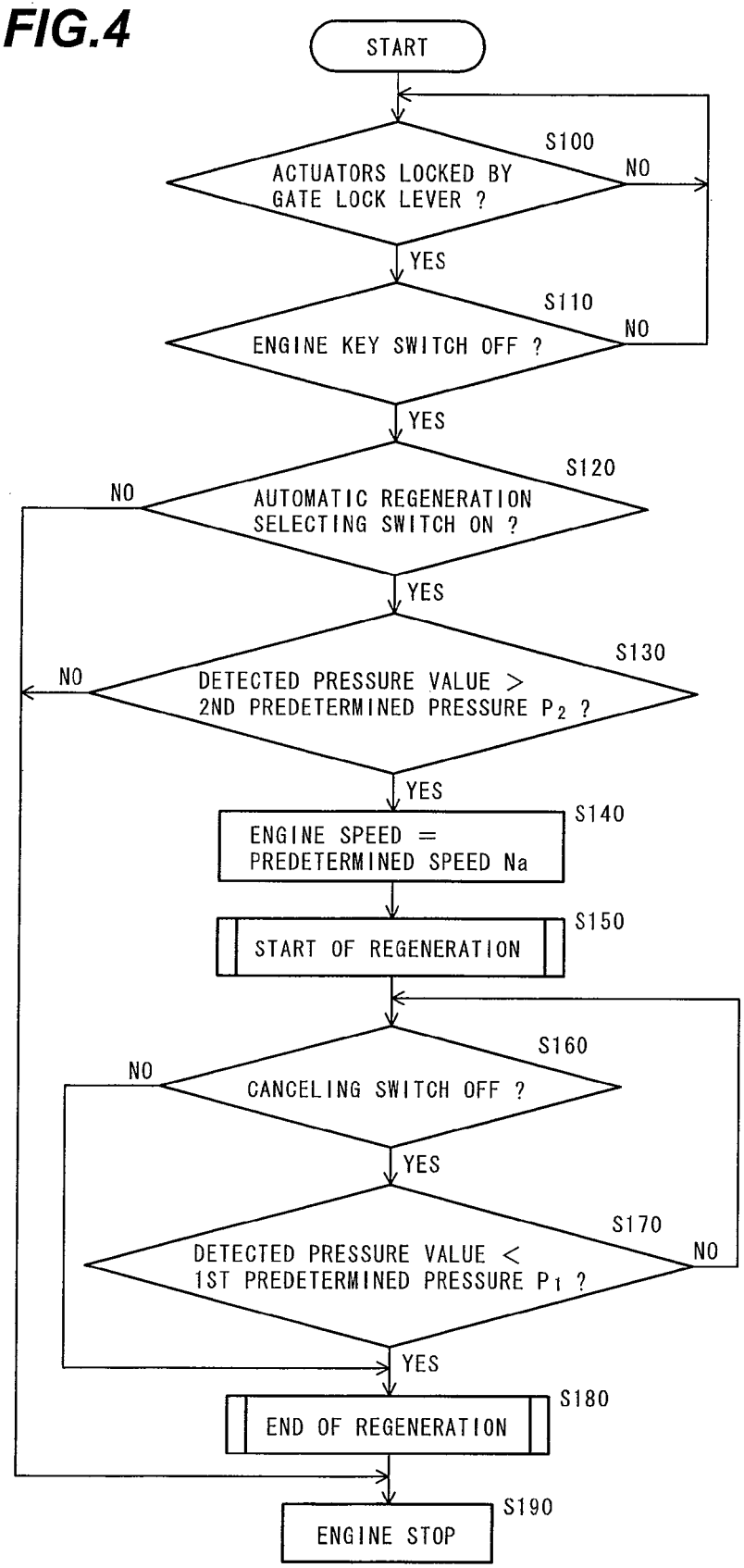
FIG. 4 is a flowchart that shows arithmetic details of a filter-regenerating arithmetic process by the controller shown in FIG. 1.

FIG. 4 is a flowchart that shows arithmetic details of the filter-regenerating arithmetic process of the controller 4.

First, in step S100, the controller 4 checks the sensor signal of the position sensor 35 and judges whether the gate lock lever 22 has been raised to the second position B, that is, whether the gate lock lever 22 is in a lock-on state with respect to the remotely controlled valves 25, 26, 27 (control lever unit). When the gate lock lever 22 is judged to be in the lock-on state, the controller 4 executes step S110 to check the command signal of the key switch 5 and judge whether the key switch 5 has been actuated to the OFF position. When the key switch 5 is judged to have been actuated to the OFF position, the controller 4 executes step S120 to check the command signal of the automatic regeneration selecting switch 38b and judge whether the switch 38b is set to the ON position (i.e., whether the automatic regeneration mode is selected). When the automatic regeneration selecting switch 38b is not set to the ON position, the controller 4 executes step S190 to stop the engine 1 by stopping the control of the electronic governor 1a. When, in step S100, the gate lock lever 22 is judged not to be in the lock-on state (i.e., judged to be in the first position A) or when, in step S110, the key switch 5 is judged not to be actuated to the OFF position (i.e., judged to be in the ON position), the controller 4 returns to the sequence immediately following the start of the process, and repeats steps S100, S110.

When it is judged in step S120 that the automatic regeneration mode is selected, the controller 4 executes step S130 to check the sensor signal of the differential pressure sensor 36 and judge whether the detected pressure value (the differential pressure across the filter 32) is greater than a second predetermined pressure P2 that is the starting pressure of forced regeneration.

FIG. 5 is a diagram showing a relationship between a PM deposition level in the filter 32 and the differential pressure across the filter 32. Increases in the PM deposition level of the filter 32 increase the differential pressure across the filter 32. Reference symbol P3 in FIG. 5 denotes a pressure threshold of a filter differential pressure equivalent to a PM deposition level existing during a start of regeneration in the conventional filter automatic regenerating technology. In the conventional filter automatic regenerating technology, the amount of PM deposited is estimated from the differential pressure across the filter, and when this estimated PM deposition level reaches a predetermined value, forced regeneration is started. The second predetermined pressure P2 (forced regeneration starting pressure) used during the judgment in step S140 of FIG. 4 is set to be lower than the pressure threshold P3 of the filter differential pressure equivalent to the estimated PM deposition level, that is, P2<P3. Reference symbol P1 in FIG. 5 denotes a first predetermined pressure at which forced regeneration is ended. In this case, P1<P2.

In the present embodiment, the detected pressure value from the differential pressure sensor 36 may be used intact. Preferably, however, the detected pressure value from the differential pressure sensor 36 is temperature-corrected by using the exhaust gas temperature sensed at the upstream side of the filter 32 by the exhaust gas temperature sensor 37, and the temperature-corrected value is used.

When, in step S130 of FIG. 4, the detected pressure value from the differential pressure sensor 36 (i.e., the differential pressure across the filter 32) is judged to be lower than the second predetermined pressure P2, since the PM deposition level in the filter 32 is judged to be too small for regeneration, the control of the electronic governor 1a is stopped and thus the engine 1 is stopped (step S190). When the detected pressure value from the differential pressure sensor 36 (i.e., differential pressure across the filter 32) is judged to be higher than the second predetermined pressure P2, the engine speed is controlled to a predetermined speed Na suitable for regeneration (step S140), and forced regeneration of the filter 32 is started (step S150).

During the control of the engine speed in step S140, a desired speed of the engine 1 is switched from a target speed that the engine control dial 2 indicates, to the predetermined speed Na higher than a low idling speed, and then on the basis of the predetermined speed Na and the actual engine speed sensed by the speed sensor 3, a fuel injection quantity at the electronic governor 1a is feedback-controlled for the engine speed to match the predetermined speed Na. The predetermined speed Na suitable for regeneration is a speed at which the exhaust gas temperature at the particular time can be increased above an activation temperature of the oxidizing catalyst 33, and this speed is a middle speed of about 1,800 rpm, for example.

During the starting process for forced regeneration of the filter 32 in step S150, the fuel injector 39, for example, is first controlled to conduct preliminary injection that is fuel injection for increased exhaust gas temperature. Next, after confirmation that the exhaust gas temperature sensed by the exhaust gas temperature sensor 37 has increased to a predetermined temperature, fuel injection (main injection) for burning-off of PM is conducted. The fuel injection for increased exhaust gas temperature is conducted to forcibly regenerate the filter by injecting fuel into the exhaust pipe 31, thus burning the fuel by heat of the exhaust gases flowing through the exhaust pipe, and increasing the exhaust gas temperature above the activation temperature of the oxidizing catalyst 33. The fuel injection for the burning-off of the PM is conducted to burn off the PM deposited in the filter 32, by injecting fuel into the exhaust pipe 31, thus supplying an unburnt internal fuel in the exhaust pipe to the oxidizing catalyst 33, then oxidizing the unburnt fuel through the oxidizing catalyst 33, and feeding the resulting reaction heat into the filter 32.

After the start of forced regeneration in step S150, whether the regeneration canceling switch 38c is in the OFF position (regeneration non-canceling position) is judged in step S160, based on the command signal of the switch 38c. When the regeneration canceling switch 38c is judged to be in the OFF position, whether the detected pressure value from the differential pressure sensor 36 (i.e., the differential pressure across the filter 32) is smaller than the first predetermined pressure P1, that is the ending pressure of forced regeneration, is judged in step S170 using the sensor signal of the sensor 36. Steps S160 and S170 are repeated when the detected pressure value is judged not to be smaller than the first predetermined pressure P1. When, in step S160, the regeneration canceling switch 38c is judged not to be in the OFF position (i.e., to be in the ON position) or when, in step S170, the detected pressure value is judged to be smaller than the first predetermined pressure P1, the driving of the regenerating fuel injector 39 is stopped in step S180 to terminate forced regeneration and then the driving of the electronic governor 1a is stopped in step S190 to stop the engine 1.

Next, operation of the exhaust gas cleaning system of the above configuration according to the present embodiment is described below.

When the operator ends the work that uses the construction machine (hydraulic excavator), he or she raises the gate lock lever 22 from the first position A to the second position B to lock various associated actuators, and then actuates the key switch 5 to the OFF position. In this case, when the operator does not wish the system to enter forced regeneration automatically during the actuation of the key switch 5 to the OFF position, he or she needs only to actuate the automatic regeneration selecting switch 38b to the OFF position (automatic regeneration mode non-selecting position) beforehand. When the automatic regeneration selecting switch 38b is in the OFF position, the actuation of the key switch 5 to the OFF position makes the controller 4 immediately stop the engine 1 as usual. That is to say, process control proceeds to steps S100, S110, S120, and S190, in that order.

When the operator wishes the system to enter forced regeneration automatically during the actuation of the key switch 5 to the OFF position, he or she actuates the automatic regeneration selecting switch 38b to the ON position (automatic regeneration mode selecting position) beforehand. Next after the operator has raised the gate lock lever 22 to the second position B and actuated the key switch 5 to the OFF position, the controller 4 senses the actuation of the switch and then if the pressure sensed by the differential pressure sensor 36 (i.e., the differential pressure across the filter 32) is higher than the second predetermined pressure P2, the controller 4 controls the engine speed to the predetermined speed Na suitable for regeneration. Forced regeneration is then started. That is to say, process control proceeds to steps S100, S110, S120, S130, S140, and S150, in that order. This operates the regenerating fuel injector 39 and as described above, the PM deposited in the filter 32 is burnt for removal. In addition, when the differential pressure across the filter 32 is reduced by the burning-off of the PM and the pressure sensed by the differential pressure sensor 36 decreases below the first predetermined pressure P1, the controller 4 terminates the regeneration automatically and stops the engine 1 (i.e., process control proceeds to steps S170, S180, and S190, in that order).

After prior actuation of the automatic regeneration selecting switch 38b to the ON position (automatic regeneration mode selecting position), when the gate lock lever 22 is raised to lock the associated actuators and the key switch 5 is turned off, if the pressure sensed by the differential pressure sensor 36 (i.e., the differential pressure across the filter 32) is lower than the second predetermined pressure P2, the controller 4 also brings the engine 1 to an immediate stop without starting forced regeneration (process control proceeds to steps S100, S110, S120, S130, and S190, in that order). This avoids unnecessary regeneration.

For a restart of the work during forced regeneration, when the operator actuates the regeneration canceling switch 38c to the ON position (regeneration canceling position), the controller 4 senses the actuation of the switch, terminates forced regeneration immediately, and stops the engine 1 (steps S160, S180, and S190 are executed in that order). After this, when the operator lowers the gate lock lever to the first position A and turns on the key switch 5, the engine 1 is started and the work can be continued.

According to the present embodiment constructed to operate as described above, the following effects can be obtained:

(a) When the operator actuates the automatic regeneration selecting switch 38b to the ON position (automatic regeneration mode selecting position) beforehand, each time he or she raises the gate lock lever 22 to lock the actuators and turns off the key switch 5 to end the work with the construction machine (hydraulic excavator), if the differential pressure across the filter 32, sensed by the differential pressure sensor 36, is higher than the second predetermined pressure P2, the system automatically enters the forced regeneration mode and burns off the PM deposited in the filter 32. In this case, for full-day operation of the construction machine, the termination of the work with the construction machine by the operator (by raising the gate lock lever 22 to lock the actuators and turning off the key switch 5) is repeated four times, namely, when the operator takes a midmorning tea break, when he or she takes a lunch break, when he or she takes a midafternoon tea break, and when he/she ends working in the afternoon to end the work for the day. This frequency is greater than a rate at which the start of forced regeneration is repeated each time the PM deposition level in the filter exceeds a deposition level existing immediately before the regeneration is started. That is to say, starting forced regeneration when turning off the key switch 5 with the actuators locked by the gate lock lever 22 allows forced regeneration to be repeated more often than in the case that the start of forced regeneration is repeated each time the PM deposition level in the filter exceeds the deposition level existing before the regeneration is started. The filter 32 can therefore be regenerated before a large amount of PM becomes deposited therein, and thus a decrease in output due to the exhaust gas pressure rise existing immediately before the regeneration is started can be avoided. In addition, the likelihood of an unusual increase in the internal temperature of the filter due to the combustion of the PM, associated with the execution of the regeneration, and consequential thermal damage to the filter can be reduced.

(b) When the differential pressure across the filter 32 is reduced below the first predetermined pressure P1, regeneration is terminated automatically and the engine 1 is stopped. Therefore, the operator does not need to wait for the termination of the regeneration and can leave the construction machine immediately after the work, so convenience improves. A decrease in the life of the filter 32 due to overburning can also be prevented.

(c) When forced regeneration begins and the need arises for the operator to restart the work before forced regeneration ends, he or she needs only to operate the regeneration canceling switch 38c. This immediately terminates forced regeneration, stopping the engine 1, and allowing the operator to restart the work at once.

(d) When the gate lock lever 22 is raised to lock the associated actuators and the key switch 5 is turned off, if the differential pressure across the filter 32 is lower than the second predetermined pressure P2, the controller 4 also brings the engine 1 to an immediate stop without starting forced regeneration. Thus, unnecessary regeneration is avoided and a decrease in the life of the filter 32 due to overburning can also be prevented.

(e) When the gate lock lever 22 is raised to lock the actuators and the key switch 5 is turned off to start automatic regeneration, since the engine speed is controlled to the predetermined speed Na suitable for the regeneration of the filter, the exhaust gas temperature can be rapidly increased to a temperature suitable for the regeneration (removal of deposited PM by burning), and thus, optimal regeneration is enabled. In addition, when the engine speed existing before the start of forced regeneration is higher than the predetermined speed Na for the regeneration, the engine speed is reduced to the particular predetermined speed Na immediately before the start of forced regeneration. Accordingly, unnecessary fuel consumption is suppressed, and thus, fuel economy improves.

(f) When the operator does not wish the system to enter forced regeneration automatically during the actuation of the key switch 5 to the OFF position, the automatic regeneration selecting switch 38b is actuated to the OFF position (automatic regeneration mode non-selecting position) beforehand so that the actuation of the key switch 5 to the OFF position immediately stops the engine 1. This allows selection of automatic regeneration according to a particular working situation or taste of the operator, thus improving convenience.

While an embodiment of the present invention has been described above, the invention is not limited to or by the embodiment and can be modified in various forms within the spirit of the invention. Some of these modifications are itemized below.

1. While the fuel injection for regeneration in the above embodiment is conducted by the regenerating fuel injector 39 provided at the exhaust pipe 31, an engine in-cylinder injection system using the electronic governor 1a may be used to inject the regenerating fuel into the exhaust gases by executing post-injection (as sub-injection) in an expansion stroke of the engine after multistage main injection. Such a technique is described in, for example, Patent Document 1 (JP-A-2005-282545) and other documents such as JP-A-2006-37925 and JP-A-2002-276340.

2. In addition, for the injection of the regenerating fuel into the exhaust gases, although a restrictor provided in the exhaust pipe may be used to dimensionally restrict a flow passageway thereof or the hydraulic pump driven by the engine may be loaded for loaded operation of the engine, whereby the exhaust gas temperature can be rapidly increased to a temperature fit for the regeneration.

3. Although the above embodiment is constructed to terminate the regeneration when the differential pressure across the filter 32 decreases below the first predetermined pressure P1 following the start of the regeneration, an elapsed time from the start of the regeneration may be managed for the regeneration to be terminated when a predetermined time (e.g., 20 minutes) elapses from the start of the regeneration.

4. In the above embodiment, when the gate lock lever 22 is raised to the second position B and then the key switch 5 is actuated to the OFF position, the system enters forced regeneration if the differential pressure across the filter 32, sensed by the differential pressure sensor 36, is judged to be higher than the second predetermined pressure P2. However, this sequence may be omitted. In this case, when the gate lock lever 22 is raised to the second position B and then the key switch 5 is actuated to the OFF position, forced regeneration is started immediately and if the differential pressure across the filter 32 during the start of the regeneration is judged to be higher than the first predetermined pressure P1, the regeneration is conducted until the particular differential pressure has decreased below the first predetermined pressure P1. Conversely if the differential pressure across the filter 32 during the start of the regeneration is lower than P1, the regeneration is immediately terminated.

5. While the above embodiment includes the automatic regeneration selecting switch 38b and allows forced regeneration to be started only when the automatic regeneration mode is selected, forced regeneration may be started whenever the gate lock lever 22 is raised to the second position B and the key switch 5 is turned off, even if the regeneration canceling switch 38c is not provided.

6. While the system according to the above embodiment includes the regeneration canceling switch 38c to allow forced regeneration to be aborted, the regeneration canceling switch 38c may not be provided and the system may be adapted so that the machine operations during forced regeneration are prohibited to assign priority to the regeneration.

7. In the above embodiment, when forced regeneration is started, the rotating speed of the engine 1 is controlled to the predetermined speed Na suitable for the regeneration. If the particular engine speed is higher than the predetermined speed Na, however, the forced regeneration may be started at the engine speed, whereby a change in the engine speed is avoided with each start of the forced regeneration.

The invention claimed is:

1. An exhaust gas cleaning system for a construction machine comprising: a diesel engine; a starting/stopping command device for issuing commands to start and stop the engine; a plurality of driven bodies actuated by motive power of the engine; operating means for issuing an operating command to each of the driven bodies; and an operational limiter actuated selectively to either a first position (A) to enable operation of the operating means, or a second position (B) to disenable the operation of the operating means,
   wherein the exhaust gas cleaning system comprises:
   a filter disposed in an exhaust system of the engine in order to trap any particulate matter included in exhaust gases;
   a regenerating device which regenerates said filter by increasing an engine exhaust gas temperature so as to burn off the particulate matter deposited therein; and
   a regeneration control device which activates said regenerating device while keeping operation of the engine when the starting/stopping command device issues the engine-stopping command with the operational limiter in the second position (B) and stops the engine and operation of the regenerating device when the regeneration of the filter is terminated.

2. The exhaust gas cleaning system according to claim 1, further comprising:
   a pressure sensor which senses a pressure loss in said filter,
   wherein the regeneration control device stops the engine and the operation of said regenerating device immediately after the pressure loss sensed by the pressure sensor has decreased below a first predetermined pressure level.

3. The exhaust gas cleaning system according to claim 1, further comprising:
   a regeneration canceling instruction device which issues a command for canceling the operation of the regenerating device,
   wherein said regeneration control device stops the engine and the operation of said regenerating device when the command for canceling the operation of said regenerating device is issued from the regeneration canceling instruction device.

4. The exhaust gas cleaning system according to claim 1, further comprising:
   a pressure sensor which senses a pressure loss in said filter,
   wherein said regeneration control device activates said regenerating device while keeping operation of the engine, after the command for stopping the engine has been issued from the starting/stopping command device with the operational limiter in the second position (B), when the pressure loss sensed by the pressure sensor is greater than a second predetermined pressure level.

5. The exhaust gas cleaning system according to claim 1, wherein said regeneration control device activates said regenerating device and controls a rotating speed of the engine to a predetermined speed, after the command for stopping the engine has been issued from the starting/stopping command device with the operational limiter in the second position (B).

6. The exhaust gas cleaning system according to claim 1 further comprising:
   a regeneration starting instruction device for issuing a command for operating said regenerating device,
   wherein said regeneration control device activates said regenerating device while keeping operation of the engine, after the command for stopping the engine has been issued from the starting/stopping command device with the operational limiter in the second position (B), only when the regeneration starting instruction device is operated to command the activation of said regenerating device.

7. The exhaust gas cleaning system according to claim 1, wherein said regenerating device includes: an oxidizing catalyst disposed at an upstream side of the filter, and fuel supply means for supplying a fuel to the oxidizing catalyst, said regenerating device activates the oxidizing catalyst by forcibly raising a temperature of the engine exhaust gases to a level higher than the activation temperature of the oxidizing catalyst, the fuel supply means supplies the fuel to the oxidizing catalyst, and then said regeneration device raises the exhaust gas temperature by means of heat generated by a reaction between the fuel and the catalyst, and burns off the particulate matter deposited in the filter.

\* \* \* \* \*